US012576578B2

(12) United States Patent　　　　(10) Patent No.:　US 12,576,578 B2
Kuroda　　　　　　　　　　　　　　　(45) Date of Patent:　　Mar. 17, 2026

(54) THREE-DIMENSIONAL DECORATIVE PIECE AND METHOD OF PRODUCING THE SAME

(71) Applicant: PLUS CORPORATION, Osaka (JP)

(72) Inventor: Takeshi Kuroda, Osaka (JP)

(73) Assignee: PLUS CORPORATION, Osaka (JP)

( * ) Notice: Subject to any disclaimer, the term of this patent is extended or adjusted under 35 U.S.C. 154(b) by 910 days.

(21) Appl. No.: 17/779,376

(22) PCT Filed: Dec. 12, 2019

(86) PCT No.: PCT/JP2019/048760
§ 371 (c)(1),
(2) Date: May 24, 2022

(87) PCT Pub. No.: WO2021/117196
PCT Pub. Date: Jun. 17, 2021

(65) Prior Publication Data
US 2022/0402190 A1　　Dec. 22, 2022

(51) Int. Cl.
*B29C 51/08*　　　(2006.01)
*B29C 51/14*　　　(2006.01)
(Continued)

(52) U.S. Cl.
CPC ............ *B29C 51/082* (2013.01); *B29C 51/14* (2013.01); *B29C 51/266* (2013.01); *B29C 51/428* (2013.01); *B29C 65/04* (2013.01); *B29C 65/5042* (2013.01); *B29C 65/74* (2013.01); *B29C 66/45* (2013.01); *B29C 66/7392* (2013.01); *B29C 66/742* (2013.01);

*B29C 66/7486* (2013.01); *B44C 1/20* (2013.01); *B29L 2031/722* (2013.01)

(58) Field of Classification Search
None
See application file for complete search history.

(56) References Cited

U.S. PATENT DOCUMENTS

| | | |
|---|---|---|
| 5,589,022 A | 12/1996 | Kuwahara |
| 2003/0213683 A1 | 11/2003 | Shimizu et al. |
| 2020/0384797 A1 | 12/2020 | Kuwahara |

FOREIGN PATENT DOCUMENTS

| | | |
|---|---|---|
| EP | 1 813 416 A1 | 8/2007 |
| EP | 3 747 638 B1 | 1/2022 |
| (Continued) | | |

OTHER PUBLICATIONS

Mar. 17, 2020 Written Opinion issued in International Patent Application No. PCT/JP2019/048760.
(Continued)

*Primary Examiner* — Christopher T Schatz
(74) *Attorney, Agent, or Firm* — OLIFF PLC

(57) ABSTRACT
A three-dimensional decorative piece that is made of a thermoplastic synthetic resin and can retain bulkiness and shape by a core and a method of producing the same. The three-dimensional decorative piece includes an upper layer molded body made of an upper layer material with a metal vapor-deposited layer and having a three-dimensional shape with a convex portion formed on its front surface side through a high-frequency dielectric heating, a core formed by curing a flowable synthetic resin filled in the convex portion of the upper layer molded body, and a substrate bonded a back surface side of the core by fusion.

2 Claims, 10 Drawing Sheets

(51) Int. Cl.

| | | |
|---|---|---|
| *B29C 51/26* | (2006.01) | |
| *B29C 51/42* | (2006.01) | |
| *B29C 65/00* | (2006.01) | |
| *B29C 65/04* | (2006.01) | |
| *B29C 65/50* | (2006.01) | |
| *B29C 65/74* | (2006.01) | |
| *B44C 1/20* | (2006.01) | |
| B29L 31/00 | (2006.01) | |

(56)      References Cited

FOREIGN PATENT DOCUMENTS

| | | | |
|---|---|---|---|
| JP | H08-230394 | A | 9/1996 |
| JP | 2001-148214 | A | 5/2001 |
| JP | 2015-036201 | A | 2/2015 |
| JP | 6606629 | B1 | 11/2019 |
| KR | 10-1226675 | B1 | 1/2013 |
| WO | 2019/130487 | A1 | 7/2019 |

OTHER PUBLICATIONS

Nov. 11, 2022 Office Action Issued in Japanese Patent Application No. 2021-563542.
Mar. 17, 2020 International Search Report issued in International Patent Application No. PCT/JP2019/048760.
Nov. 30, 2023 extended Search Report issued in European Patent Application No. 19955942.8.

F I G. 1
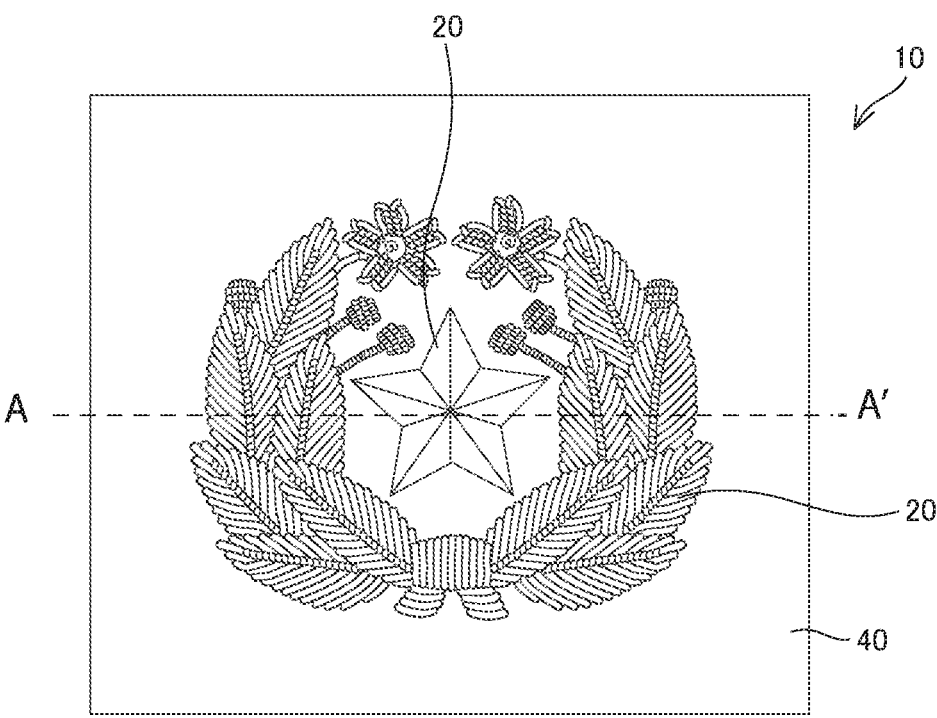
F I G. 2
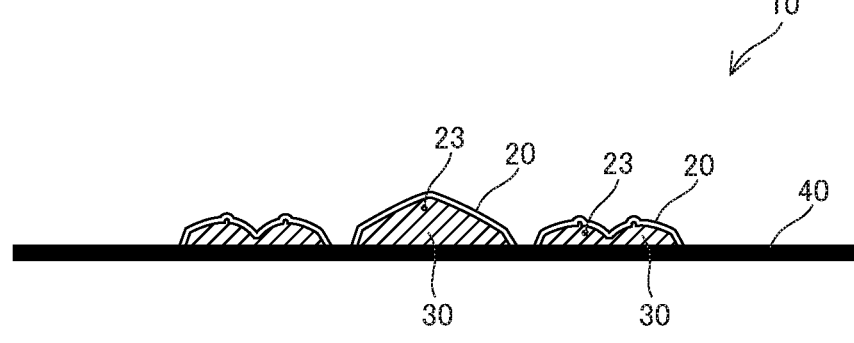

F I G .  3
(a)
51
50
51
B ——————————— B'
52
52
(b)
54
33
50
52          31    51          51   52(34)
F I G .  4
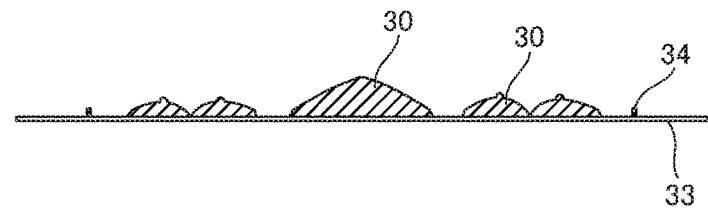
30    30    34
33

F I G.  5
( a )
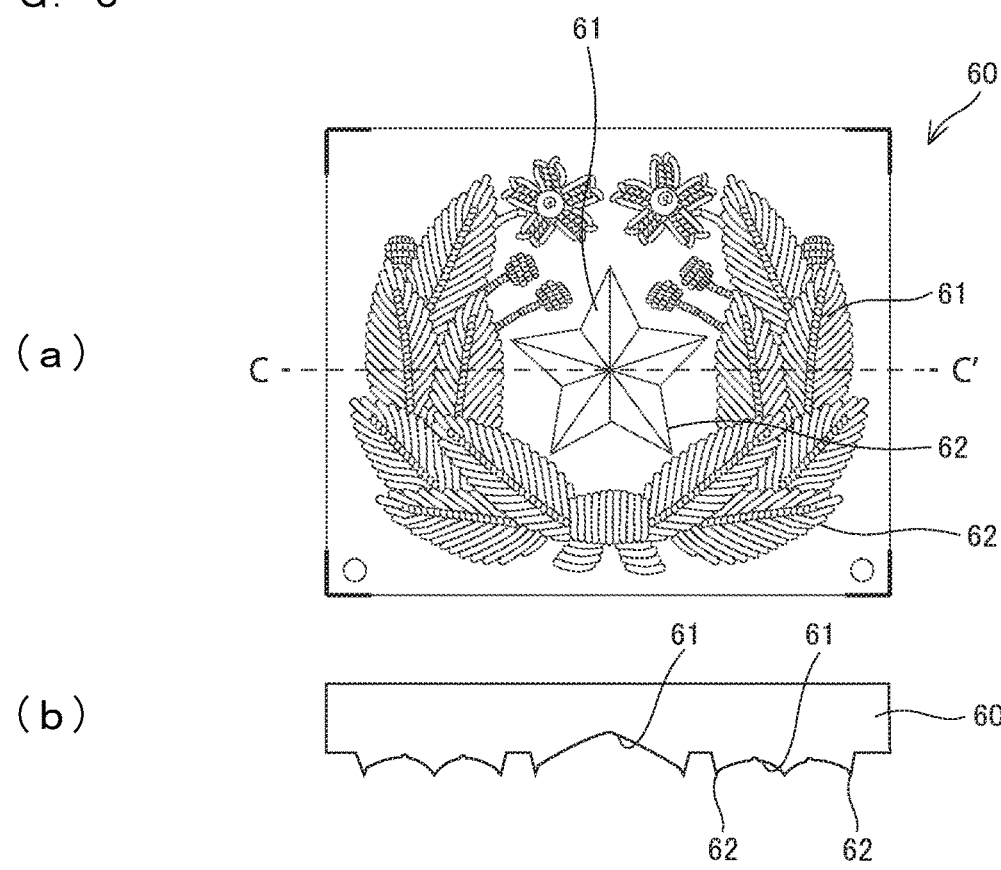
( b )
F I G.  6
( a )
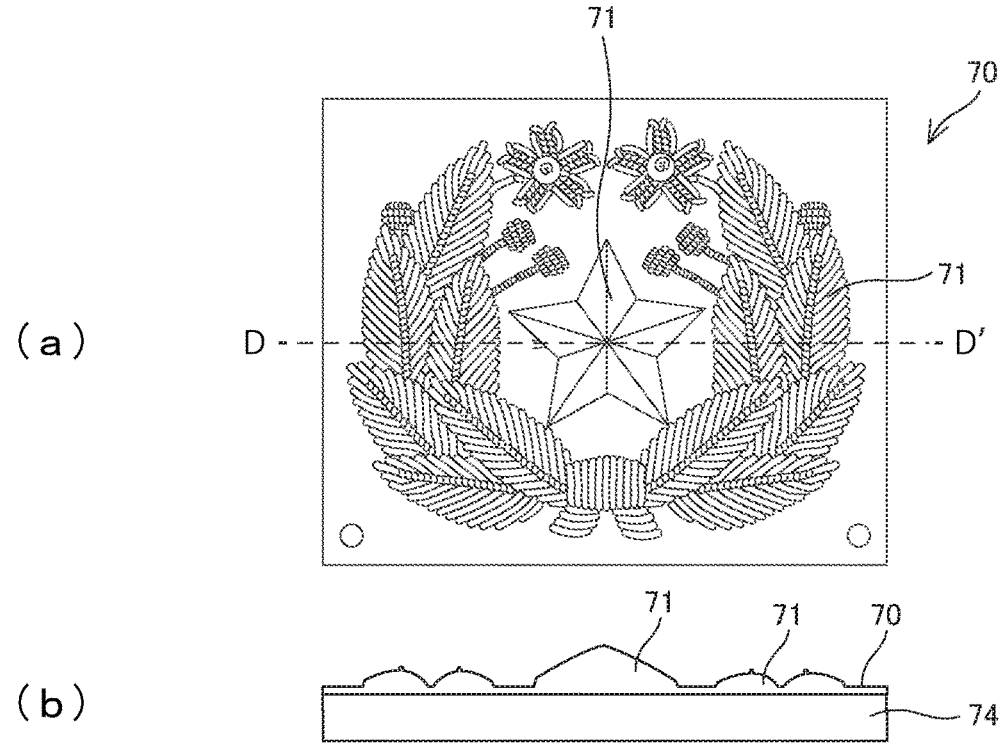
( b )

F I G.  7
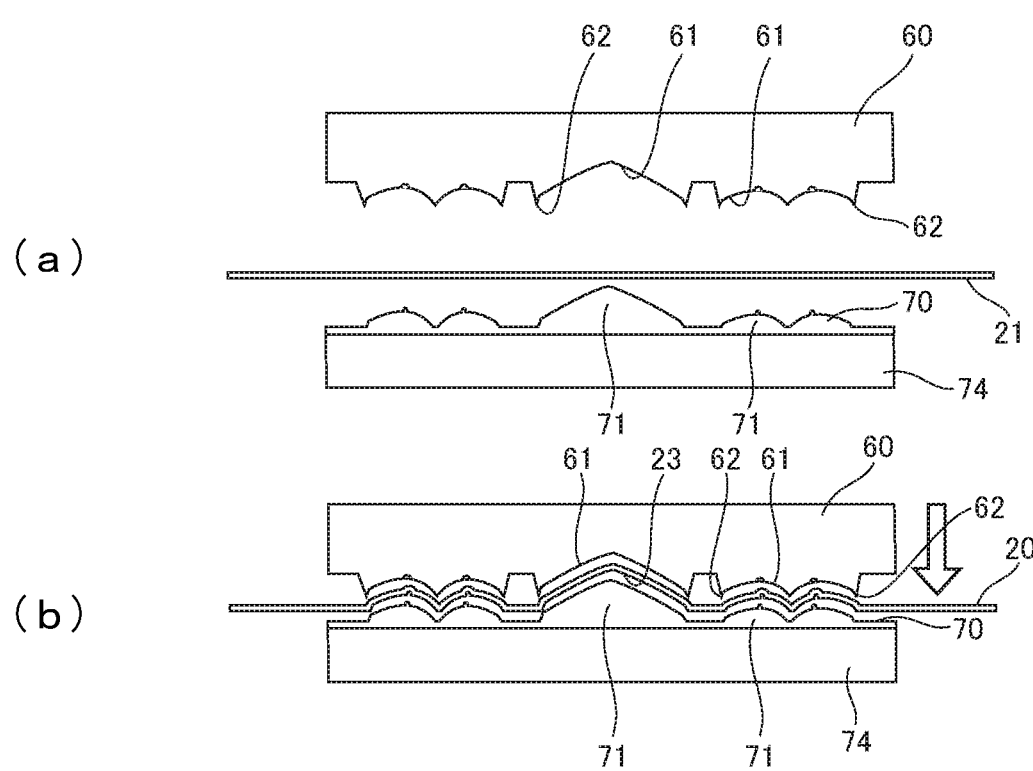
（a）
（b）
F I G.  8
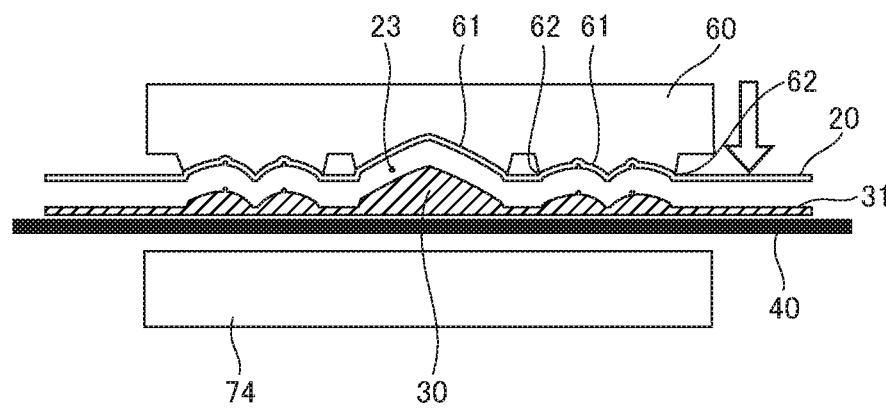

F I G.  9
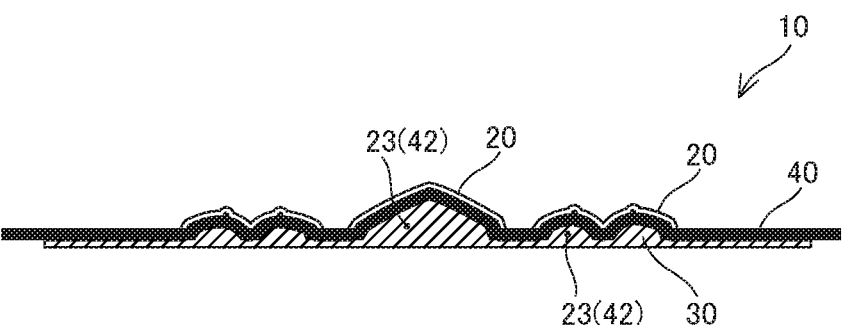

F I G.   1 3
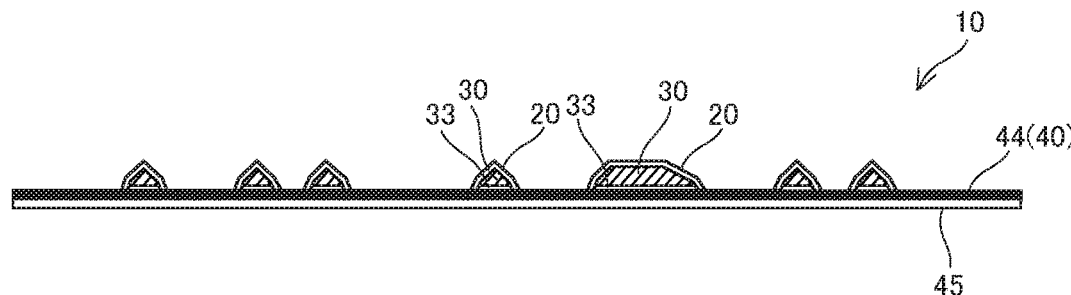

F I G .  1 4
( a )
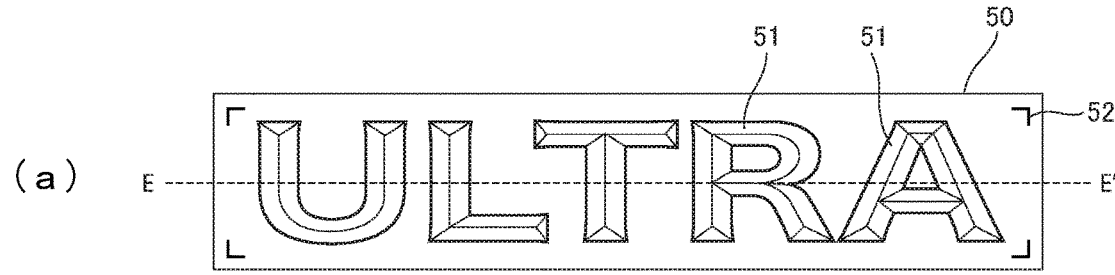
( b )
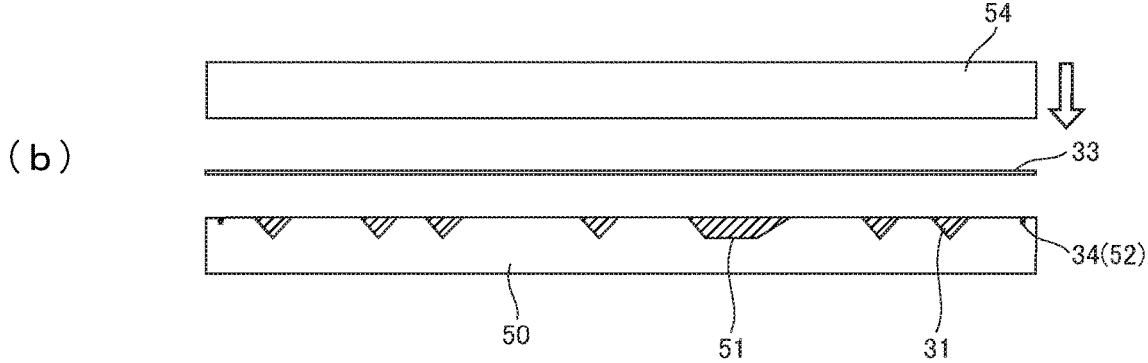
F I G .  1 5
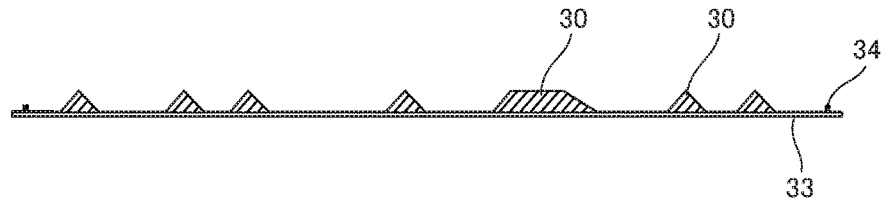

FIG. 16
(a)
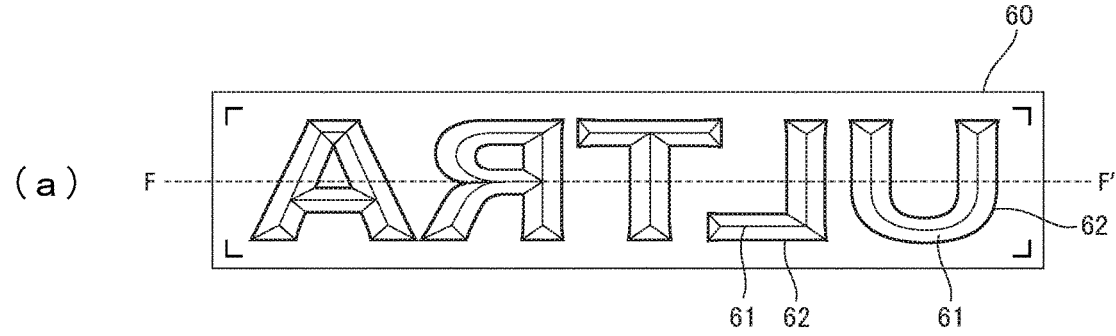
(b)
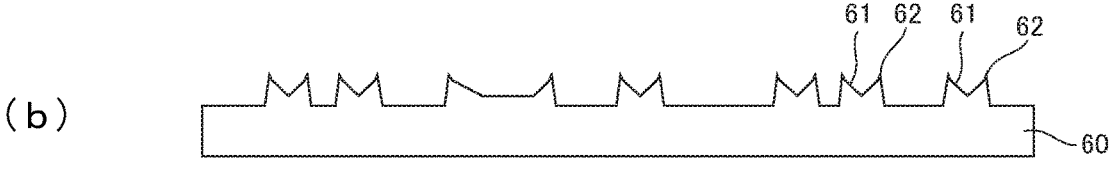
FIG. 17
(a)
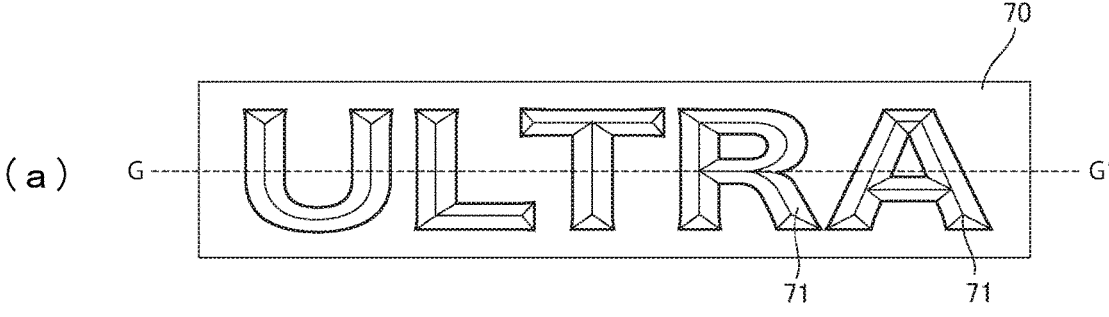
(b)
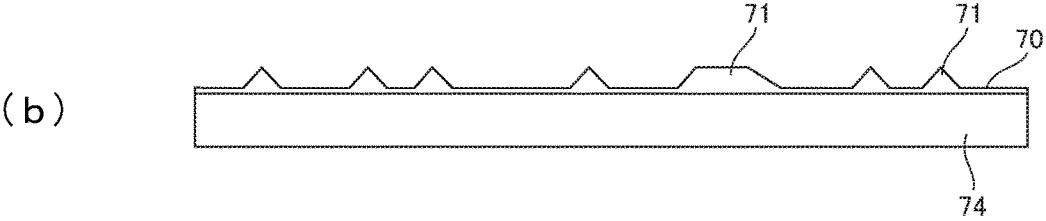

F I G. 1 8
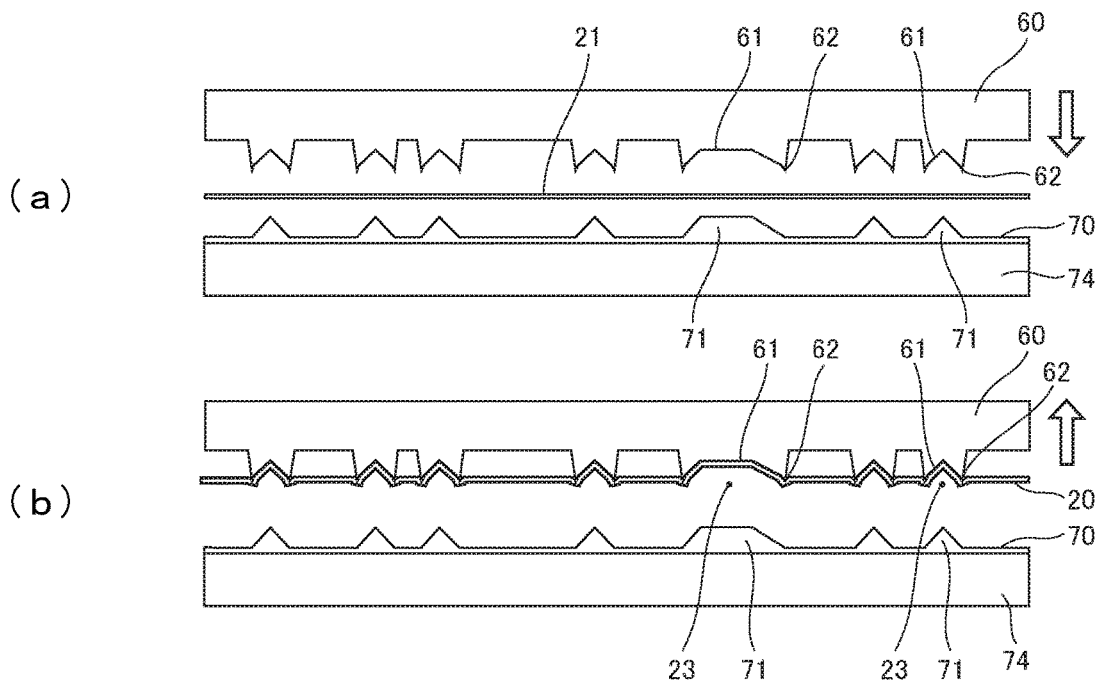
(a)
(b)
F I G. 1 9
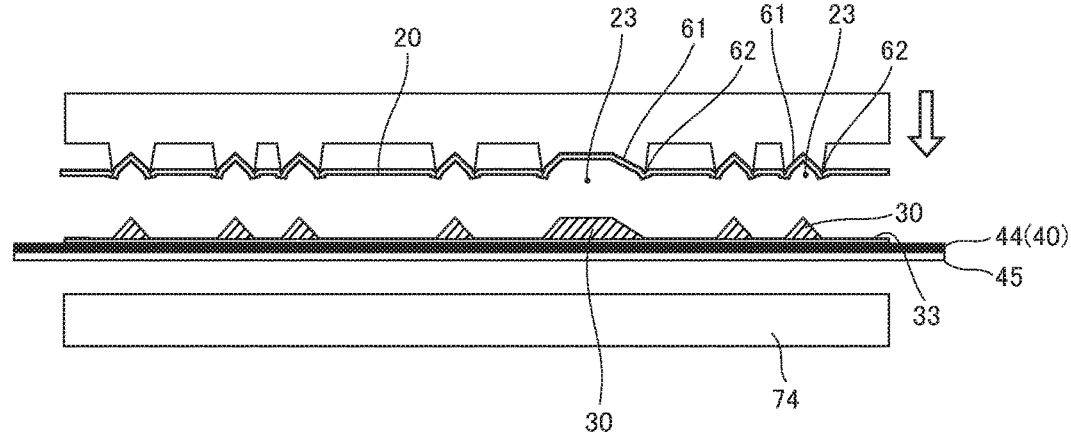

THREE-DIMENSIONAL DECORATIVE PIECE AND METHOD OF PRODUCING THE SAME

TECHNICAL FIELD

The present invention relates to a three-dimensional decorative piece to be attached to an adherend such as clothing, a bag, a hat, a car, a motorcycle, a boat, a home appliance, and a game machine, and a method for producing the same. More particularly, the present invention relates to a bulky three-dimensional decorative piece that can retain its shape by a core and a method for producing the same.

BACKGROUND ART

There has been proposed three-dimensional decorative pieces such as emblems, appliques, and stickers manufactured by high-frequency dielectric heating (for example, Patent Document 1).

The three-dimensional decorative piece is made by placing an upper layer material having a metal vapor-deposited layer and a lower layer material including a thermoplastic synthetic resin sheet or a foamed resin sheet between an engraved die and a flat plate die, subjecting the upper and lower layer materials to high-frequency dielectric heating, softening and shaping the lower layer material, and bonding the upper layer material and the lower layer material by fusion.

PRIOR ART DOCUMENT

Patent Document 1: Japanese Patent No. 3235943

SUMMARY OF INVENTION

Problems to be Solved by the Invention

The three-dimensional decorative pieces are required to have a bulkiness in order to enhance the sense of luxury and three-dimensionality. To produce bulky three-dimensional decorative pieces, it is required to make the lower layer material thicker. However, as a characteristic of high-frequency dielectric heating, radio waves are concentrated at the cutting edge of the blade or at the corners of the pattern, so the upper and lower layer materials were not heated as a whole, making it impossible to successfully perform shaping and joining with heat. Therefore, the three-dimensional decorative piece that can be manufactured is limited to about 2 mm in thickness. To produce a bulky three-dimensional decorative piece, it may be possible to provide only the upper layer material without the lower layer material and to provide a cavity in the upper layer material. However, since the upper layer material is thin, it is difficult to retain the shape of the three-dimensional decorative piece, resulting in that the three-dimensional decorative pieces was dented or crushed when the upper material is pressed down or hit by objects.

An object of the present invention is to provide a three-dimensional decorative piece made of thermoplastic synthetic resin that has a bulkiness and can retain its three-dimensional shape supported by a core, and a method for producing the same.

Means to Overcome the Problems

A three-dimensional decorative piece according to the present invention comprises an upper layer molded body composed of an upper layer material with a metal vapor-deposited layer and formed into a three-dimensional shape having a convex portion on its front surface side through high-frequency dielectric heating, a core formed by curing a flowable synthetic resin filled in the convex portion of the upper layer molded body, and a substrate bonded to a back surface side of the core by fusion.

A thermoplastic synthetic resin film may be disposed between the core and the substrate.

A three-dimensional decorative piece according to the present invention comprises an upper layer molded body composed of an upper layer material with a metal vapor-deposited layer and formed into a three-dimensional shape having a convex portion on its front surface side through high-frequency dielectric heating, a core formed by curing a flowable synthetic resin filled in the convex portion of the upper layer molded body, a thermoplastic synthetic resin film bonded to a back surface side of the core by fusion, and a double-coated adhesive tape applied on a back surface side of the thermoplastic synthetic resin film.

A three-dimensional decorative piece according to the present invention comprises an upper layer molded body composed of an upper layer material with a metal vapor-deposited layer and formed into a three-dimensional shape having a convex portion on its front surface side through high-frequency dielectric heating, a substrate having a concave portion on its back surface side along the convex portion of the upper layer molded body and bonded to a back surface side of the upper layer molded body by fusion, and a core formed by curing a flowable synthetic resin filled in the concave portion of the substrate.

The synthetic resin for forming the core may be a material selected from the group consisting of a thermoplastic synthetic resin sol, a thermosetting synthetic resin, and an ambient temperature curable two-component synthetic resin.

A method of producing a three-dimensional decorative piece having a three-dimensional design, the method comprising:

a step of molding a core, including filling a flowable synthetic resin into a core molding die engraved with the three-dimensional design and served as an electrode, subjecting the synthetic resin to high-frequency dielectric heating while being pressed from above with a flat plate die served as an electrode, and curing the synthetic resin to form the core having a shape with a convex portion corresponding to the three-dimensional design;

a step of forming an upper layer molded body, including placing an upper layer material with a metal vapor-deposited layer between a concave die engraved with the three-dimensional design and served as an electrode and a convex die served as an electrode, subjecting the upper layer material to high-frequency dielectric heating while being pressed to form the upper layer molded body having a shape with a convex portion corresponding to the three-dimensional pattern on its front surface side;

a step of placing a substrate on a flat plate die served as an electrode and then placing the core on the substrate;

a step of integrating the upper layer molded body, the core and the substrate, including positioning the flat plate die and the concave die opposed to each other while holding the upper layer molded body on the concave die, moving the concave die toward the flat plate die such that the convex portion of the upper layer molded body puts on the convex portion of the core, and subjecting the upper layer molded body, the core and the substrate to high-frequency dielectric heating to bond the upper layer molded body, the core and the substrate all together by fusion; and a step of melt-cutting the upper layer molded body and the core along the three-dimensional design.

In the step of molding the core, the synthetic resin is filled into the molding die, the thermoplastic synthetic resin film is put on the synthetic resin from above, and then subjected to high-frequency dielectric heating while being pressed by the flat plate die from above.

A method of producing a three-dimensional decorative piece having a three-dimensional design, the method comprising:

a step of placing an upper layer material having a metal vapor-deposited layer on a substrate;

a step of disposing the upper layer material and the substrate between a concave die engraved with the three-dimensional design and served as an upper electrode and a convex die served as a lower electrode, with the upper layer material opposed to the concave die;

a step of integrating an upper layer molded body and the substrate, including subjecting the upper layer material and the substrate to high-frequency dielectric heating while being pressed to join the upper layer material and the substrate together by fusion and to form the upper layer material into the upper layer molded body, forming the upper layer molded body and the substrate to a shape having a convex portion corresponding to the three-dimensional design, and forming a concave portion on a back surface of the substrate side;

a step of forming a core, including reversing the concave die, reversing the integrated upper molded die and substrate, positioning the reversed concave die as the lower electrode die, placing the reversed upper die and substrate on the reversed concave die, filling a flowable synthetic resin material into the concave portion of the substrate, subjecting the synthetic resin material to high-frequency dielectric heating while being pressed by a flat plate die and curing the synthetic resin material to form the core;

a step of integrating the upper layer molded body, the substrate, and the core; and a step of melt-cutting the upper layer molded body along the three-dimensional design.

A method of producing a three-dimensional decorative piece having a three-dimensional design, the method comprising:

a step of molding a core, including filling a flowable synthetic resin into a core molding die engraved with the three-dimensional design and served as an electrode, putting a thermoplastic synthetic resin film on the synthetic resin, subjecting the thermoplastic synthetic resin film and the synthetic resin to high-frequency dielectric heating while being pressed from above with a flat plate die served as an electrode, and curing the synthetic resin to form the core having a shape with a convex portion corresponding to the three-dimensional design and to join the core and the thermoplastic synthetic resin film by fusion;

a step of forming an upper layer molded body, including placing an upper layer material having a metal vapor-deposited layer between a concave die engraved with the three-dimensional design and served as an electrode and a convex die served as an electrode, subjecting the upper layer material to high-frequency dielectric heating while being pressed to form the upper layer molded body having a shape with a convex portion corresponding to the three-dimensional pattern on its front surface side;

a step of placing a double-coated adhesive tape having a releasable paper on a flat plate die served as an electrode with the releasable paper positioned on the flat plate die side and placing the core on the double-coated adhesive tape with the thermoplastic synthetic resin film positioned on the bottom side;

a step of integrating the upper layer molded body and the core, including positioning the flat plate die and the concave die opposed to each other while holding the upper layer molded body on the concave die, moving the concave die toward the flat plate die such that the convex portion of the upper layer molded body puts on the convex portion of the core, and subjecting the upper layer molded body and the core to high-frequency dielectric heating to bond the upper layer molded body and the core together by fusion; and a step of melt-cutting the upper layer molded body along the three-dimensional design.

Effect of the Invention

According to the three-dimensional decorative piece of the present invention and the method for producing the same, the upper layer material with a metal vapor-deposited layer is formed into an upper layer molded body, and then a core is filled in a back surface side of the convex portion corresponding to the three-dimensional design of the decorative piece. As the shape of the convex portion of the upper layer molded body can be fixed and retained by the core, the height of the convex portion of the upper layer molded body can be increased, whereby a bulky three-dimensional decorative piece ca be produced.

BRIEF DESCRIPTION OF THE DRAWINGS

FIG. 1 is a plan view of a three-dimensional decorative piece according to the first embodiment.

FIG. 2 is a cross-sectional view taken along line A-A' of FIG. 1.

FIG. 3 (*a*) is a plan view of a core molding die according to the first embodiment, and FIG. 3 (*b*) is a cross-sectional view taken along line B-B'.

FIG. 4 is a cross-sectional view of the core.

FIG. 5 (*a*) is a plan view of an upper concave die and FIG. 5 (*b*) is a cross-sectional view taken along line C-C'.

FIG. 6 (*a*) is a plan view of a lower convex die, and FIG. 6 (*b*) is a cross-sectional view taken along line D-D'.

FIG. 7 is an illustration showing a step of forming an upper layer molded body.

FIG. 8 is an illustration showing a step of joining the upper layer molded body, the core, and the substrate all together.

FIG. 9 is a cross-sectional view of the three-dimensional decorative piece according to the second embodiment.

FIG. 13 is a cross-sectional view of the three-dimensional decorative piece of the third embodiment.

FIG. 14 (*a*) is a plan view of a core molding die according to the third embodiment, and FIG. 14 (*b*) is a cross-sectional view taken along line E-E'.

FIG. 15 is a cross-sectional view of the core.

FIG. 16 (*a*) is a plan view of the upper concave die and FIG. 16 (*b*) is a cross-sectional view taken along line F-F'.

FIG. 17 (*a*) is a plan view of the lower convex die and FIG. 17 (*b*) is a cross-sectional view taken along line G-G'.

FIG. 18 is an illustration showing a step of forming the upper layer molded body.

FIG. 19 is an illustration showing a step of joining the upper layer molded body, the core, and the substrate (double-coated adhesive tape) all together.

EMBODIMENT FOR CARRYING OUT THE INVENTION

Figure 10:
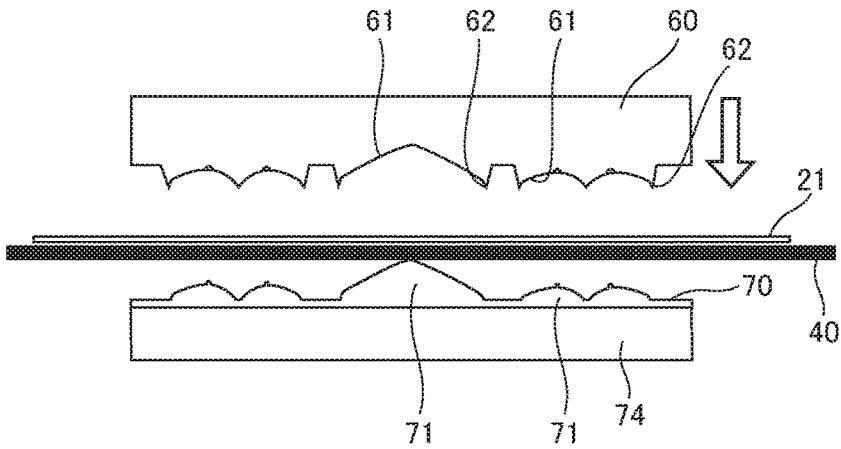
FIG. 10 is an illustration showing a step of joining the upper layer molded body and the substrate together in the second embodiment.

Hereinafter, a three-dimensional decorative piece 10 of the present invention and a method for producing the same will be described with reference to the drawings. The thickness, size, unevenness, shape, design, etc., of the three-dimensional decorative piece 10 shown in each of the figures are only examples, and other various designs can be employed. In addition, some of the thicknesses and other features are exaggerated for illustrative purposes.

First Embodiment

FIG. 1 shows the three-dimensional decorative piece 10 of the present invention as seen from its front surface side. An upper layer molded body 20 constituting a three-dimensional design is provided on a substrate 40 made of a fabric or the like. The upper layer molded body 20 of the three-dimensional decorative piece 10 is formed on the inner side thereof with a convex portion 23 along the three-dimensional design that bulges in the direction away from the substrate 40, as shown in FIG. 2, the cross-sectional view taken along line A-A' in FIG. 1. A core 30 is filled in the convex portion 23 between the upper layer molded body 20 and the substrate 40. The core 30 is cured and serves to fixe and retain the shape of the three-dimensional decorative piece 10, i.e., the shape of the upper layer molded body 20, preventing the upper layer molded body 20 from being dented or crushed. The upper layer molded body 20 and the core 30, and the core 30 and the substrate 40 are joined together, for example, by fusion.

The upper layer molded body 20 can be formed into a three-dimensional shape by molding a thermoplastic synthetic resin film and a sheet of upper layer material 21 of a plurality of films including a metal vapor-deposited layer. Examples of the thermoplastic synthetic resin film include soft thermoplastic synthetic resins such as polyvinyl chloride and polyurethane. For the metal material of the metal vapor-deposited layer, indium can be exemplified. The metal vapor-deposited layer can be provided on the upper layer material 21 by evaporating metal material to the thermoplastic synthetic resin film. The upper layer material 21 may have an adhesive layer or a dye transfer prevention film such as an ethylene-vinyl alcohol copolymer (EVOH) on the bottom surface of the metal vapor-deposited layer between the films, or may have an additional thermoplastic synthetic resin film.

The upper surface of the upper layer material 21 can be printed on an upper surface with a desired pattern and a desired color using transparent color ink, matte ink, gloss ink, or the like. Furthermore, screen printing UV-curable transparent UV ink or the like on top of these printings provides fine line patterns to express a sense of luxury like moor embroidery, massiveness, precision, depth of color, metallic feel, and even fine irregularities.

The core 30 can be formed by curing a flowable synthetic resin material 31. As will be described later, the synthetic resin material 31 is molded and cured in advance in a die along the three-dimensional shape of the convex portion 23 of the upper layer molded body 20, and is then fitted into the convex portion 23, whereby the shape of the upper layer molded body 20 is fixed and retained. Examples of the synthetic resin material that can be used for the core 30 include, but are not limited to, a thermoplastic synthetic resin sol, a thermosetting synthetic resin, and an ambient temperature curable two-component synthetic resin.

The substrate 40 may be a fabric such as a cloth or a textile, a non-woven fabric, or a double-coated tape. The substrate 40 also may be a cloth on which a non-woven fabric is stacked, or a cloth on which a double-coated tape is laminated.

Molding of the upper layer molded body 20, molding and curing of the core 30, fusion bonding of the upper layer molded body 20 and the core 30, and fusion bonding of the core 30 and the substrate 40 can be performed by high-frequency dielectric heating. Of course, other known molding methods, such as compression molding, casting molding, etc., can also be employed, but it takes 10 minutes or more to heat the die. On the other hand, high-frequency dielectric heating requires only 10-30 seconds. Therefore, the use of high-frequency dielectric heating is highly effective.

The three-dimensional decorative piece 10 of the first embodiment can be produced by a step of molding core 30, a step of forming upper layer molded body 20, and a step of integrating upper layer molded body 20, core 30, and substrate 40. Each step will be described below.

<Step of Molding Core 30>

In the step of molding the core 30, the synthetic resin material 31 is molded to the shape of the three-dimensional decorative piece 10, i.e., the shape of the convex portion 23 of the upper layer molded body 20, and cured to obtain the core 30. FIG. 3 shows an embodiment of a die for molding the core 30, wherein FIG. 3 (*a*) is a plan view of a core molding die 50, and FIG. 3 (*b*) is a cross-sectional view taken along line B-B' and shows a cross section of the core molding die 50 and a flat plate die 54. The core molding die 50 is engraved with a concave pattern 51 corresponding to the three-dimensional design of the three-dimensional decorative piece 10 to be formed. In the present embodiment, the concave pattern 51 is a star-shaped three-dimensional structure and a plant-shaped three-dimensional structure surrounding the star-shaped three-dimensional structure, wherein the star-shaped three-dimensional structure and the plant-shaped three-dimensional structure are formed apart like an island.

For positioning the molded core 30 into another die in a step described later, the core molding die 50 is preferably formed with a dent as a positioning register mark 52 on the outside of the concave pattern 51.

The core molding die 50 and the flat plate die 54 are relatively movable toward and away from each other. In the illustrated embodiment, the flat plate die 54 descends toward and ascends away from the core molding die 50 placed with the concave pattern 51 facing upward.

The core molding die 50 and the flat plate die 54 are coupled to a high-frequency dielectric oscillator. When a high-frequency voltage is applied between the core molding die 50 and the flat plate die 54 in such a state that they are close to each other, a dielectric object (synthetic resin material 31 in this embodiment) is subjected to high-frequency dielectric heating.

Then, a flowable synthetic resin material 31, e.g., a thermoplastic synthetic resin sol, is filled into the concave pattern 51 of the core molding die 50, as shown in FIG. 3 (b). After the synthetic resin material 31 is introduced, a film 33, such as a thermoplastic synthetic resin film, is placed on the core molding die 50, depending on necessity. In the present embodiment, as the concave patterns 51 disposed on the core molding die 50 are spaced apart like an island, a film 33 is placed on the core molding die 50 to prevent core 30 and core 30 from being separated from each other. Therefore, in the case where the core 30 is connected to one, the film 33 may be dispensed with. Alternatively, the core molding die 50 may be formed with a recess in fluid communication with a plurality of concave patterns 51, such that synthetic core material 31 filled in the recess connects cores 30 to be formed in the core molding die.

In operation, the core molding die 50 and the flat plate die 54 are brought close to each other, the synthetic resin material 31 is subjected to high-frequency dielectric heating and cooled, whereby the synthetic resin material 31 is cured to form a core 30. Then, after the flat plate die 54 is moved away from the core molding die 50, the molded and cured core 30 is removed from the core molding die 50. FIG. 4 shows the core 30 removed from the core molding die 50. In FIG. 4, the core 30 is in such a state that the portions of the three-dimensional designed portions are connected by the film 33. Further, it can be seen that the film 33 is formed with a positioning protrusion 34 at a position corresponding to the register mark 52 of the core molding die 50.

<Step of Forming Upper Layer Molded Body 20>

Next, the step of forming the upper layer molded body 20 will be described. It is noted that the molding step of the upper layer molded body 20 can be performed before, after, or in parallel with the above-described step of molding the core 30.

FIGS. 5 to 7 are cross-sectional views of a die for forming the upper layer molded body 20. As shown in FIG. 7, the die comprises an upper concave die 60 (FIG. 5), a flat plate die 74 and a lower convex die 70 placed on the flat plate die 74 (FIG. 6). The upper concave die 60 may include a concave portion 61 corresponding to the three-dimensional shape of the upper layer molded body 20 to be formed, and a melt-cutting blade 62 formed on the periphery of the concave portion 61 and configured to cut the upper layer molded body 20, as shown in FIG. 5 (a) and FIG. 5 (b), a cross-sectional view taken along line C-C'. Further, the lower convex die 70 may include a convex portion 71 corresponding to the three-dimensional shape of the upper layer molded body 20 and placed on the flat plate die 74, as shown in FIG. 6 (a) and FIG. 6 (b), a cross-sectional view taken along line D-D'. The flat plate die 74 may use the flat plate die 54 used in the step of molding the core 30.

The upper concave die 60 is coupled to a high-frequency dielectric oscillator. The lower convex die 70 is coupled to a high-frequency dielectric oscillator via the flat plate die 74. A high-frequency dielectric heating can be performed between the upper concave die 60 and the lower convex die 70 by applying a high-frequency voltage between them in such a state where the upper concave die 60 is brought close to the lower convex die 70.

In operation, a sheet of an upper layer material 21 for forming the upper layer molded body 20 is placed between the upper concave die 60 and the lower convex die 70, as shown in FIG. 7 (a). The upper layer material sheet 21 is then subjected to a high-frequency dielectric heating applied between the die 60 and the 70 and is formed into an upper layer molded body 20 having a three-dimensional shape corresponding to the three-dimensional design of the concave portion 61 of the die 60 and the convex portion 71 of the die 70, as shown in FIG. 7 (b). When the upper layer molded body 20 is integrated with the core 30 and the substrate 40 in the next step, the upper layer molded body 20 requires to be disposed and positioned in the upper concave die 60 again. Therefore, the convex die 60 is preferable to have the register mark such as positioning protrusion and dent in place. Alternatively, the upper layer molded body 20 formed in the upper concave die 60 may be fixed to the upper concave die 60 with an adhesive tape or other means, without taking out of the upper concave die 60, before moving it to the next step.

<Step of Integrating Upper Layer Molded Body 20, Core 30, and Substrate 40>

Subsequently, the core 30 and the upper layer molded body 20 obtained above are integrated on the substrate 40. Unnecessary portions of the core 30 and the upper layer molded body 20 are cut by the melt-fusing blade 62, so that the three-dimensional decorative piece is brought into the state that can be taken out.

It is noted that the upper concave die 60 and the flat plate die 74 used in the step of forming the upper layer molded body 20 can be used in this step as well. Specifically, the lower convex die 70 shown in FIG. 7 is removed from the flat plate die 74. The state where the lower convex die 70 is removed is shown in FIG. 8. The substrate 40 is placed on the flat plate die 74, and then the core 30 is placed on the substrate 40. The core 30 and the flat plate die 74 are positioned using protrusions (not shown) or other means to ensure that the core 30 fits well into the convex portion 23 of the upper layer molded body 20 to be integrated.

Then, the upper concave die 60 having attached thereto the upper layer molded body 20 with an adhesive tape or the like is brought close to the flat plate die 74 from above, and the core 30 is inserted into the convex portion 23 of the upper layer molded body 20, as shown in FIG. 8.

From this state, the upper concave die 60 is pressed against the flat plate die 74 and high-frequency dielectric heating is performed to integrate the upper layer molded body 20 with the core 30 and also the substrate 40 with the core 30. The upper layer molded body 20 is cut into a desired three-dimensional shape with the melt-cutting blade 62.

Unnecessary portions of the upper layer molded body 20 are removed from the upper layer molded body 20, the core 30, and the substrate 40 that were joined and integrated, whereby the three-dimensional decorative piece 10 as shown in FIGS. 1 and 2 can be obtained. The three-dimensional decorative piece 10 comprises an upper layer molded body 20 having a three-dimensional shape like as shown in FIGS.

1 and 2, a core 30 filled in a convex portion 23 inside of the upper layer molded body 20, and a substrate 40 joined to the core 30. The substrate 40 may also be cut into a desired shape with scissors, a cutter, a Thomson remover, or the like.

With the three-dimensional decorative piece 10 of the present invention, the core 30 is filled inside the convex portion 23 of the upper layer molded body 20, so its three-dimensional shape can be fixed and retained. This three-dimensional shape is not the one formed by shaping the lower layer material as in the known art. Since the core 30 is thus formed into a three-dimensional shape in advance, the present three-dimensional decorative piece 10 can be formed thicker and achieve more significant bulkiness than the conventional three-dimensional decorative piece. For example, the three-dimensional decorative piece 10 is more than 3-10 mm in thickness without including the thickness of the substrate 40. Further, according to the present embodiment, substrate 40 has a flat shape and does not have irregularities corresponding to the shape of the upper layer molded body 20 as in the following embodiment, preventing the substrate 40 from being caused wrinkling.

Second Embodiment

In the first embodiment, a core 30 is formed on a substrate 40, and an upper layer molded body 20 is formed on the core 30, as shown in FIGS. 1 and 2. On the other hand, a three-dimensional decorative piece 10 in the second embodiment has such a structure that a substrate 40 and an upper layer molded body 20 are placed on a core 30. The materials of each layer and other parts similar to those in the first embodiment are omitted from the description as appropriate.

The core 30 is made in the same manner as that of the first embodiment.

<Step of Integrating Upper Layer Molded Body 20 and Substrate 40>

Figure 11:
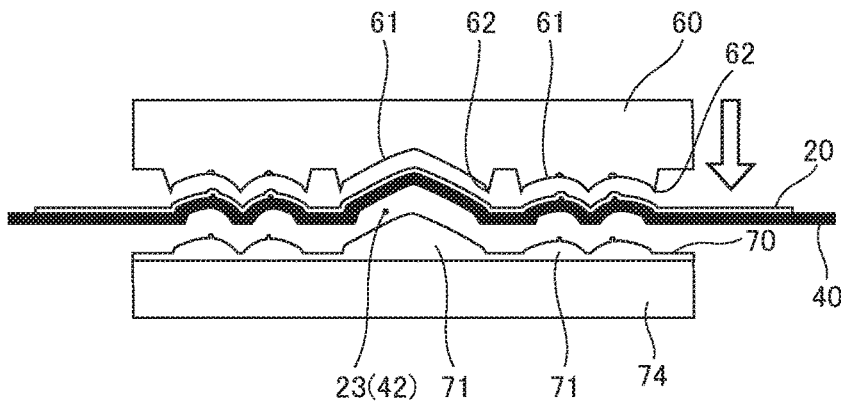
FIG. 11 is an illustration showing a step of joining the upper layer molded body and the substrate together after the step shown in FIG. 10.

To carry out the integration of the upper layer molded body 20 and the substrate 40, the upper concave die 60 and the lower convex die 70 described above with reference to FIGS. 5 and 6 in the first embodiment can be employed. As shown in FIGS. 10 and 11, the lower convex die 70 is placed on the flat plate die 74.

As shown in FIG. 10, the substrate 40 and the upper layer material 21 placed on the substrate 40 are disposed between the upper concave die 60 served as an electrode and the lower convex die 70 served as an electrode, with the substrate 40 positioned on the lower convex die 70 side. Then, as shown in FIG. 11, the upper concave die 60 is lowered and high-frequency dielectric heating is performed for the upper layer molded body. As a result, the upper layer material 21 and the substrate 40 are deformed and formed into a shape having convex portions 23 along the upper concave die 60, i.e., a shape having concave portions 42 along the convex portion 71 of the lower convex die 70. When the upper layer material 21 is cooled and cured in this state, the upper layer material 21 is formed into an upper layer molded body 20. The upper layer molded body 20 and the substrate 40 are integrated into a three-dimensional shape.

<Step of Integrating Upper Layer Molded Body 20, Substrate 40 and Core 30>

Figure 12:
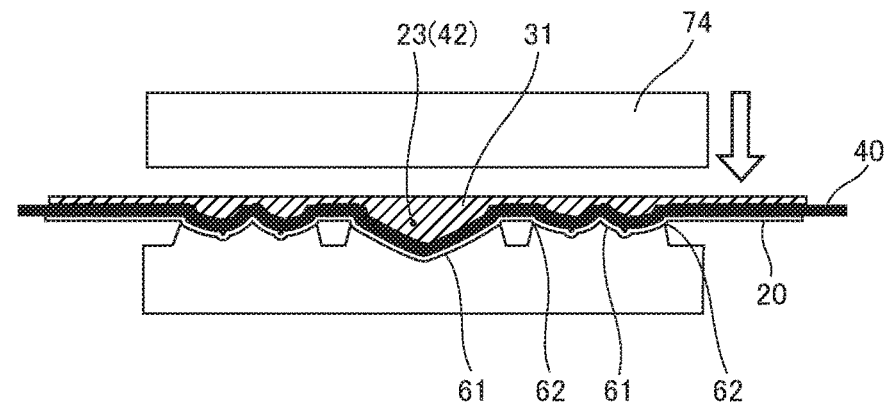
FIG. 12 is an illustration showing a step of placing the molded core in a concave portion of the substrate and joining the core and the substrate together.

As shown in FIG. 12, the upper concave die 60 with the upper layer molded body 20 and the substrate 40 is reversed, and then the core 30 is placed into the concave portions 42 of the substrate 40. Then, the flat plate die 74 is lowered to subject the core 30, the substrate 40 and the upper layer molded body 20 to high-frequency dielectric heating between the upper concave die 60 served as an electrode and the flat plate die 74 served as an electrode while being pressed, whereby the substrate 40 is integrated with the core 30. The upper layer molded body 20 is cut into a desired three-dimensional shape by the melt-cutting blade 62.

Unnecessary portions of the upper layer molded body 20 are removed from the upper layer molded body 20, the substrate 40, and the core 30 that are joined and integrated, whereby the three-dimensional decorative piece 10 having a cross-section shown in FIG. 9 can be obtained. The three-dimensional decorative piece 10 is in the form wherein the upper layer molded body 20 and the substrate 40 have a three-dimensional shape and the core 30 is filled in the convex portion 23 inside of the substrate 40. The three-dimensional shape of the upper layer molded body 20 is fixed and retained by the core 30.

With the three-dimensional decorative piece 10, the three-dimensional shape can be fixed and retained. This three-dimensional shape is not the one formed by shaping the lower layer material as in the known art. Since the core 30 is thus formed into a three-dimensional shape in advance, the present three-dimensional decorative piece 10 can be formed thicker and achieve more significant bulkiness than the conventional three-dimensional decorative piece. For example, the three-dimensional decorative piece 10 can be more than 3-10 mm in thickness,

Third Embodiment

In the first embodiment, the substrate 40 is made of a fabric. In the third embodiment, a double-coated tape 44 is used in replacement with the fabric. FIG. 13 is a cross-sectional view of the three-dimensional decorative piece 10 obtained by the third embodiment. The double-coated tape 44 is an adhesive tape having both front and back surfaces. In the present embodiment, a releasable paper 45 is affixed to one of the sides in order for the three-dimensional decorative piece 10 to be directly applied to a car body or the like. The same passages as in the first embodiment will be omitted from the description as appropriate. In this embodiment, the three-dimensional design uses an alphabet character "ULTRA," which differs from the first and second embodiments, as shown in FIG. 14 and others.

<Step of Molding and Curing Core 30>

FIG. 14 shows a cross-sectional view of a die for molding the core 30 of the third embodiment. FIG. 14 (a) is a plan view of a core molding die 50 and FIG. 14 (b) is a cross-sectional view of the core molding die 50 taken along line E-E' and a flat plate die 54. As shown in FIG. 14 (a), the core molding die 50 is engraved with a concave pattern 51 corresponding to the three-dimensional design "ULTRA" of the three-dimensional decorative piece 10 to be formed.

As in the first embodiment, the flowable synthetic resin material 31 is filled into the concave pattern 51 of the core molding die 50, and then a film 33 such as a thermoplastic synthetic resin film is put on the synthetic resin material 31, as shown in FIG. 14 (b).

In this state, the core molding die 50 and the flat plate die 54 are brought closer, high-frequency dielectric heating and cooling are performed, so that the synthetic resin material 31 is cured and integrated with the film 33. When the high-frequency dielectric heating is completed, the flat plate die 54 is moved away from the core molding die 50, then the molded and cured core 30 is taken out from the core molding die 50. It can be seen in FIG. 15 that the portions spaced apart like an island are connected by the film 33.

<Step of Molding of Upper Layer Molded Body 20>

The molding step of the upper layer molded body 20 can be performed before, after, or in parallel with the above-described step of molding the core 30, also in this embodiment.

FIGS. 16 and 17 are cross-sectional views of a die for forming the upper layer molded body 20. As in the first embodiment, the die comprises an upper concave die 60 (FIG. 16), a flat plate die 74 and a lower convex die 70 placed on the flat plate die 74 (FIG. 16). The upper concave die 60 may include a concave portion 61 corresponding to the three-dimensional shape of the upper layer molded body 20 to be formed, and a melt-cutting blade 62 formed on the periphery of the concave portion 61 and configured to cut the upper layer molded body 20, as shown in FIG. 16 (a) and FIG. 16 (b), a cross-sectional view taken along line F-F'. Further, the lower convex die 70 may include a convex portion 71 corresponding to the three-dimensional shape of the upper layer molded body 20 and can be placed on the flat plate die 74 for use, as shown in FIG. 17 (a) and FIG. 17 (b), a cross-sectional view taken along line G-G'. All of the dies are connected to a high frequency dielectric oscillator.

In operation, a sheet of the upper layer material 21 for forming the upper layer molded body 20 is placed between the upper concave die 60 and the lower convex die 70, as shown in FIG. 18 (a). After moving the die 60 and the die 70 toward each other, a high-frequency dielectric heating is performed, and the upper layer material sheet 21 is formed into an upper layer molded body 20 having a three-dimensional shape corresponding to the three-dimensional design of the concave portion 61 of the die 60 and the convex portion 71 of the die 70, as shown in FIG. 18 (b). When the upper layer molded body 20 is completed, the upper concave die 60 and the upper layer molded body 20 are moved upward. At this time, it is preferable to move the upper layer molded body 20 and the upper concave die 60 together e.g., by applying an adhesive tape to the upper layer molded body 20.

<Step of Integrating Upper Layer Molded Body 20, Core 30 and Double-Coated Tape 44>

Subsequently, the lower convex die 70 is removed from the flat plate die 74. The double-coated adhesive tape 44 is disposed on the flat plate die 74 with a releasable paper 45 placed on the flat plate die 74 side. And the core 30 is applied on the double-coated tape 44. Application of the core 30 on the tape 44 may be conducted on the flat plate die 74 after installation of the die, but can be performed before installing the flat plate die 74. The core 30 is aligned with the flat plate die 74 by a positioning protrusion (not shown) or the like and fitted into the convex portion of the upper layer molded body 20 to be integrated.

From this state, as shown in FIG. 19, the upper concave die 60 is lowered together with the upper layer molded body 20, and the core 30 is fitted into the convex portion 23 of the upper layer molded body 20. Then, the upper concave die 60 is further lowered and high-frequency dielectric heating is performed, whereby the core 30 is integrated with the upper layer molded body 20 together. The upper layer molded body 20 is then cut into the desired three-dimensional shape by the melt-cutting blade 62.

When unnecessary portions of the upper layer molded body 20 are removed from the upper layer molded body 20, the core 30 and the double-coated adhesive tape 44 that were joined and integrated, whereby the three dimensional decorative piece 10 attached to the double-coated adhesive tape 44 is obtained and has the core 30 filled in the convex portion 23 inside of the upper layer molded body 20 having the three-dimensional shape as shown in FIG. 13. Thus obtained three-dimensional decorative piece 10 can be applied to a car body or the like by peeling off the releasable paper 45.

The above description is for the purpose of explaining the present invention, and should not be construed as limiting the scope of the invention described in the claims. In addition, each part of the present invention is not limited to the above embodiment, and it goes without saying that various modifications can be made within the technical scope described in the claims.

For example, unnecessary portion of the upper layer molded body 20 can be performed with Thomson kiss cut, laser kiss cut or the like, instead of melt-cutting by high frequency.

EXPLANATION OF REFERENCE NUMBERS

10 Three-dimensional decorative piece
20 Upper layer molded body
30 Core
40 Substrate
44 Double-coated adhesive tape
50 Core molding die
54 Flat plate die served as an electrode
60 Upper concave die served as an electrode
70 Lower convex die served as an electrode
74 Flat plate die served as an electrode

The invention claimed is:

1. A method of producing a three-dimensional decorative piece having a three-dimensional design, the method comprising:

a step of molding a core, including filling a flowable synthetic resin into a core molding die engraved with the three-dimensional design and served as an electrode, subjecting the synthetic resin to a first high-frequency dielectric heating while being pressed from above with a first flat plate electrode die, and curing the synthetic resin to form the core having a shape with a first convex portion corresponding to the three-dimensional design;

a step of forming an upper layer molded body, including placing an upper layer material with a metal vapor-deposited layer between a concave electrode die engraved with the three-dimensional design and a convex electrode die, subjecting the upper layer material to a second high-frequency dielectric heating while being pressed to form the upper layer molded body having a shape with a second convex portion corresponding to the three-dimensional pattern on its front surface side;

a step of placing a substrate on a second flat electrode plate die and then placing the core on the substrate;

a step of integrating the upper layer molded body, the core, and the substrate, including positioning the second flat plate electrode die and the concave electrode die opposed to each other while holding the upper layer molded body on the concave electrode die, moving the concave electrode die toward the second flat plate electrode die such that the second convex portion of the upper layer molded body puts on the first convex portion of the core, and subjecting the upper layer molded body, the core, and the substrate to a second high-frequency dielectric heating to bond the upper layer molded body, the core and the substrate all together by fusion; and a step of melt-cutting the upper layer molded body and the core along the three-dimensional design.

2. The method of producing a three-dimensional decorative piece according to claim 1, wherein the step of molding the core includes filling the synthetic resin into the core molding die, putting a thermoplastic synthetic resin film on the synthetic resin from above, and subjecting to the first high-frequency dielectric heating while being pressed by the first flat plate electrode die from above.

\* \* \* \* \*